United States Patent
Wu et al.

(10) Patent No.: US 11,010,265 B2
(45) Date of Patent: May 18, 2021

(54) DECENTRALIZED DATA PROTECTION SYSTEM USING LOCAL METADATA

(71) Applicant: EMC IP Holding Company LLC, Hopkinton, MA (US)

(72) Inventors: Pengfei Wu, Shanghai (CN); Assaf Natanzon, Tel Aviv (IL); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 16/253,005

(22) Filed: Jan. 21, 2019

(65) Prior Publication Data
US 2020/0233760 A1    Jul. 23, 2020

(51) Int. Cl.
  *G06F 11/00*   (2006.01)
  *G06F 11/20*   (2006.01)
  *G06F 11/10*   (2006.01)

(52) U.S. Cl.
  CPC ...... *G06F 11/2023* (2013.01); *G06F 11/1092* (2013.01); *G06F 11/1096* (2013.01); *G06F 11/2056* (2013.01); *G06F 2201/82* (2013.01)

(58) Field of Classification Search
  CPC .. G06F 11/1092; G06F 11/1096; G06F 11/16; G06F 11/2056; G06F 11/1425; G06F 11/2082
  See application file for complete search history.

(56) References Cited

U.S. PATENT DOCUMENTS

| | | | | |
|---|---|---|---|---|
| 8,037,349 | B2* | 10/2011 | Mandagere | G06F 11/1435 714/6.3 |
| 10,664,574 | B1* | 5/2020 | Powers | G06F 21/6218 |
| 2012/0185437 | A1* | 7/2012 | Pavlov | G06F 16/182 707/652 |

FOREIGN PATENT DOCUMENTS

CN    201811192254.2    10/2018

OTHER PUBLICATIONS

S.A. Weil et al., "CRUSH: Controlled, Scalable, Decentralized Placement of Replicated Data," Proceedings of the ACM/IEEE Conference on Supercomputing (SC), Nov. 11-17, 2006, 12 pgs, Article No. 122.

(Continued)

*Primary Examiner* — Charles Ehne
(74) *Attorney, Agent, or Firm* — Ryan, Mason & Lewis, LLP (57) ABSTRACT

In a decentralized system of nodes configured to provide data protection functionality, wherein at least a subset of the nodes store and share data using content-addresses managed via a distributed hash table in each of the subset of nodes, a given one of the subset of nodes locally stores: a data protection policy to be implemented by the given node; data protected on the given node; and metadata comprising information indicating placement of a given data set on one or more other ones of the subset of nodes. The given node accesses the locally stored metadata to manage protection of the given data set on the one or more other ones of the subset of nodes.

20 Claims, 8 Drawing Sheets

(56) References Cited

OTHER PUBLICATIONS

Juan Benet, "IPFS—Content Addressed, Versioned, P2P File System (Draft 3)," http://arxiv.org/abs/1407.3561, Jul. 2014, 11 pages.
U.S. Appl. No. 15/959,386 filed in the name of Pengfei Wu et al. filed Apr. 23, 2018 and entitled "Decentralized Data Protection System for Multi-Cloud Computing Environment."
U.S. Appl. No. 16/048,785 filed in the name of Pengfei Wu et al. filed Jul. 30, 2018 and entitled "Decentralized Policy Publish and Query System for Multi-Cloud Computing Environment."
U.S. Appl. No. 16/234,515, filed Dec. 27, 2018.

* cited by examiner

```
{placement: {
    • "1023": {method: "consistent_hash", args: {distance: XOR}}
    • "15": {method: "multicloud", args: {cloud: [Azure, AliCloud]}}
    • "0": {method: "duplicated", args: {dupfactor: 3}} ← priority <10 is
      special, stating the data protection method used, such as duplicated,
      archive, RAID...
    • "10": {method: "geography", args: {location: [HongKong, Singapore,
      Sydney]}}
  },
  event: {
    • ... (events such as data life time reached, not enough storage space,
      etc.)
  }}
```

```
[IPFS_HASH]: {      ← the hash may not be the hash of the real data stored locally
  time: 12312332131,
  place: [(nodes, ips)],
  status: {...},   ← replica, archived data, RAID chunk, life time, etc...
  fulfill: true/false
  policy: {block_id: 10, hash: Qmfewkejfiefsvnwlejo}, ← policy used while creating the data
}
```

DECENTRALIZED DATA PROTECTION SYSTEM USING LOCAL METADATA

FIELD

The field relates generally to distributed computing environments and, more particularly, to data protection techniques in such distributed computing environments.

BACKGROUND

Enterprises such as corporations typically utilize a distributed computing environment, such as a cloud computing environment, to manage their data. One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, enterprises may choose to host their data (as well as applications, workloads, services, etc.) on a combination of private and public clouds that form a multi-cloud computing environment. One or more clouds may also be referred to as a "data center." Alternatively, a data center may be comprised of one or more clouds.

The emergence of multi-cloud computing environments increases the need for data protection and management across multiple clouds. However, effective data protection and management across multiple clouds can present significant challenges.

SUMMARY

Illustrative embodiments of the invention provide decentralized data protection techniques using local metadata in a computing node environment. For example, in a decentralized system of nodes configured to provide data protection functionality, wherein at least a subset of the nodes store and share data using content-addresses managed via a distributed hash table in each of the subset of nodes, a given one of the subset of nodes locally stores: a data protection policy to be implemented by the given node; data protected on the given node; and metadata comprising information indicating placement of a given data set on one or more other ones of the subset of nodes. The given node accesses the locally stored metadata to manage protection of the given data set on the one or more other ones of the subset of nodes.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. As mentioned above, a multi-cloud computing environment employed by an enterprise may comprise two or more clouds (e.g., two or more private clouds, two or more public clouds, or a combination of one or more private clouds and one or more public clouds). The term "enterprise" as used herein is intended to be broadly construed, and may comprise, for example, one or more businesses, one or more corporations or any other one or more entities, groups, or organizations. An "entity" as illustratively used herein may be a person and/or system.

One type of scalable service that cloud infrastructure typically provides to users is cloud storage. However, it is realized that once users migrate their data to a given cloud platform for storage, so-called "data gravity" prevents them from migrating the data beyond the given cloud platform. Data gravity is the concept that as a data set grows larger, it attracts more software (applications) that utilizes the data toward the physical location of the data. Thus, as more software is located where the data resides, it becomes difficult to migrate the data to another location. This situation inevitably creates data silos and results in so-called "vendor lock-in" (a user is unable or unwilling based on cost to migrate the data from the cloud platform of one cloud provider to another).

Solutions have been proposed for multi-cloud data protection in an attempt to overcome the data silo and vendor lock-in issues. By way of example only, the U.S. patent application identified as U.S. Ser. No. 15/959,386, entitled "Decentralized Data Protection System for Multi-Cloud Computing Environment," and filed on Apr. 23, 2018, the disclosure of which is incorporated by reference in its entirety herein, discloses a multi-cloud data protection system that addresses data silo, vendor lock-in, as well as other issues. More particularly, in a multi-cloud computing environment with a plurality of cloud platforms wherein each platform has one or more nodes, the cloud platforms are operatively coupled via a unified message bus forming a decentralized storage network so that data stored in one cloud is accessible from any other cloud, and thus not limited by APIs dedicated to each of the cloud vendors. In one or more illustrative embodiment, the decentralized storage network can be implemented via an Interplanetary File System (IPFS) protocol. IPFS is an open-source protocol that provides a decentralized method of storing and sharing files relying on a content-addressable, peer-to-peer hypermedia distribution. The compute nodes in an IPFS network form a distributed file system. IPFS operates by coupling devices/nodes with the same system of files. More particularly, IPFS uses a distributed hash table (DHT) with a block exchange (BitSwap) and namespace methodology that operates across disparate devices and unreliable networks. IPFS operates similarly to a torrent system, except that rather than exchanging media, IPFS exchanges objects based on a key-value data store. Any type of content can be inserted into the data sharing system, and the system returns a key (i.e., in the form of a hash value) that can be used to retrieve the content from a node that has it stored thereon at any time. Accordingly, IPFS is a content addressing protocol instead of a location addressing protocol. That is, the hash value is independent of the origin of the data set and can be hosted anywhere in the system.

In addition, decentralized data protection has been proposed wherein data is protected by creating a number of replicas required by the user and ensuring that the replicas are in a healthy state. By "healthy state," for example, it is meant that the data set is stored on a node that is reachable, e.g., not experiencing a node failure. In alternative embodiments, the term healthy state can have different meanings.

Figure 1:
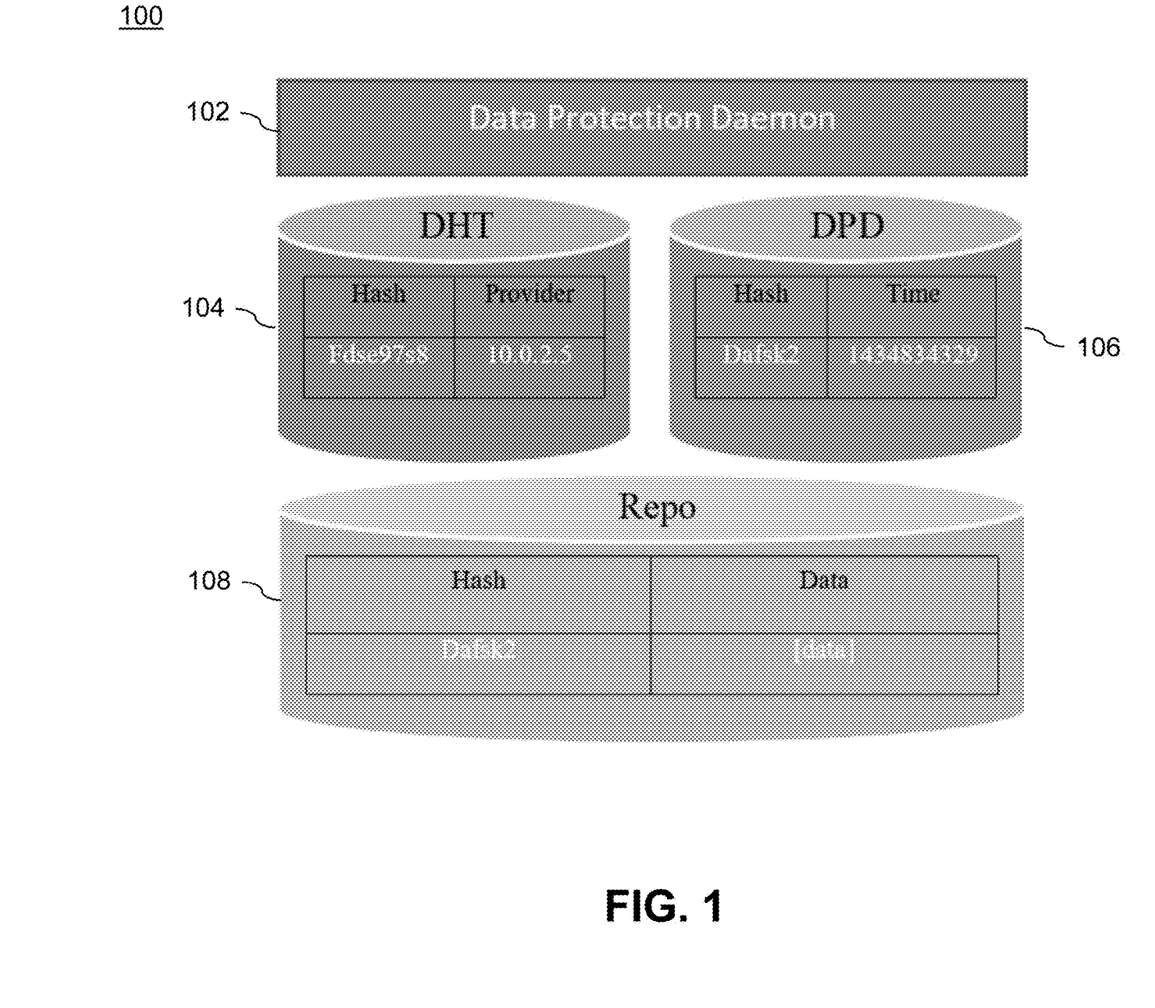
FIG. 1 illustrates a decentralized data protection system using distributed hash tables with which one or more illustrative embodiments may be implemented.

FIG. 1 illustrates a node architecture 100 for a decentralized data protection system using a DHT. It is to be appreciated that a decentralized data protection system includes a plurality of nodes, each with node architecture 100, where one or more nodes are part of each cloud in a multi-cloud computing environment. Data protection daemon 102 manages local storage and database functions, as well as sends and receives data protection messages. DHT 104 assists in finding providers of data in the decentralized data protection system. Data protection database (DPD) 106 manages additional information for data protection, e.g., the hash digest of the data locally protected and the Unix time (normalized to the same time zone, e.g., Greenwich Time). Storage repository (Repo) 108 provides a key-value (hash-data) based storage, e.g., LevelDB, for the locally protected data.

More particularly, DHT is employed to track the storage locations (nodes in the decentralized data protection system) of the data replicas. Every time the system tries to check the status of data replicas, it has to query the DHT to figure out where the replicas are stored, and then communicate directly with the nodes at which the replicas are stored to make sure that the replicas are in a healthy state.

One advantage of this design is that the system can work in a highly dynamic environment, with nodes joining and leaving the system constantly. This is a typical case for an internet-scale system. However, the design also has several limitations, e.g.: a) if a consistent hash-based method is employed to place replicas, the data has to be migrated every time nodes join and leave the system; b) monitoring the system status solely based on DHT is costly, resulting in significant communications among nodes; and c) it is very difficult to extend the system with more data protection features such as, e.g., Redundant Array of Independent Disks (RAID) like features and data archiving features. These limitations of system architecture 100 are further described below.

Data migration. In the case of a decentralized data protection system using DHT only, if a smart data placement method is employed, stored data has to be migrated every time nodes join or leave the system. Data migration is very costly and an internet-scale data protection system is highly dynamic, which means nodes join and leave the system constantly-.

Communications among nodes. In the case of a decentralized data protection system using DHT only, every time the local data protection engine has to query the DHT to figure out how many data replicas there are in the system, which is a time-consuming process, this introduces significant communications among nodes which is very costly.

Limited features. If the system only relies on DHT to protect the data, features the system can provide are limited. That is, the system can only protect the data by creating multiple replicas, which is not very storage space efficient. It is very difficult to implement advanced data protection features such as RAID like data protection and data archiving, since the system cannot tell whether the data stored locally is a forward error correction-based (e.g., erasure code-based) chunk or an archived file.

Given the challenges described above, illustrative embodiments provide a decentralized data protection system using local metadata to address these and other drawbacks associated with existing decentralized data protection systems.

Figure 2:
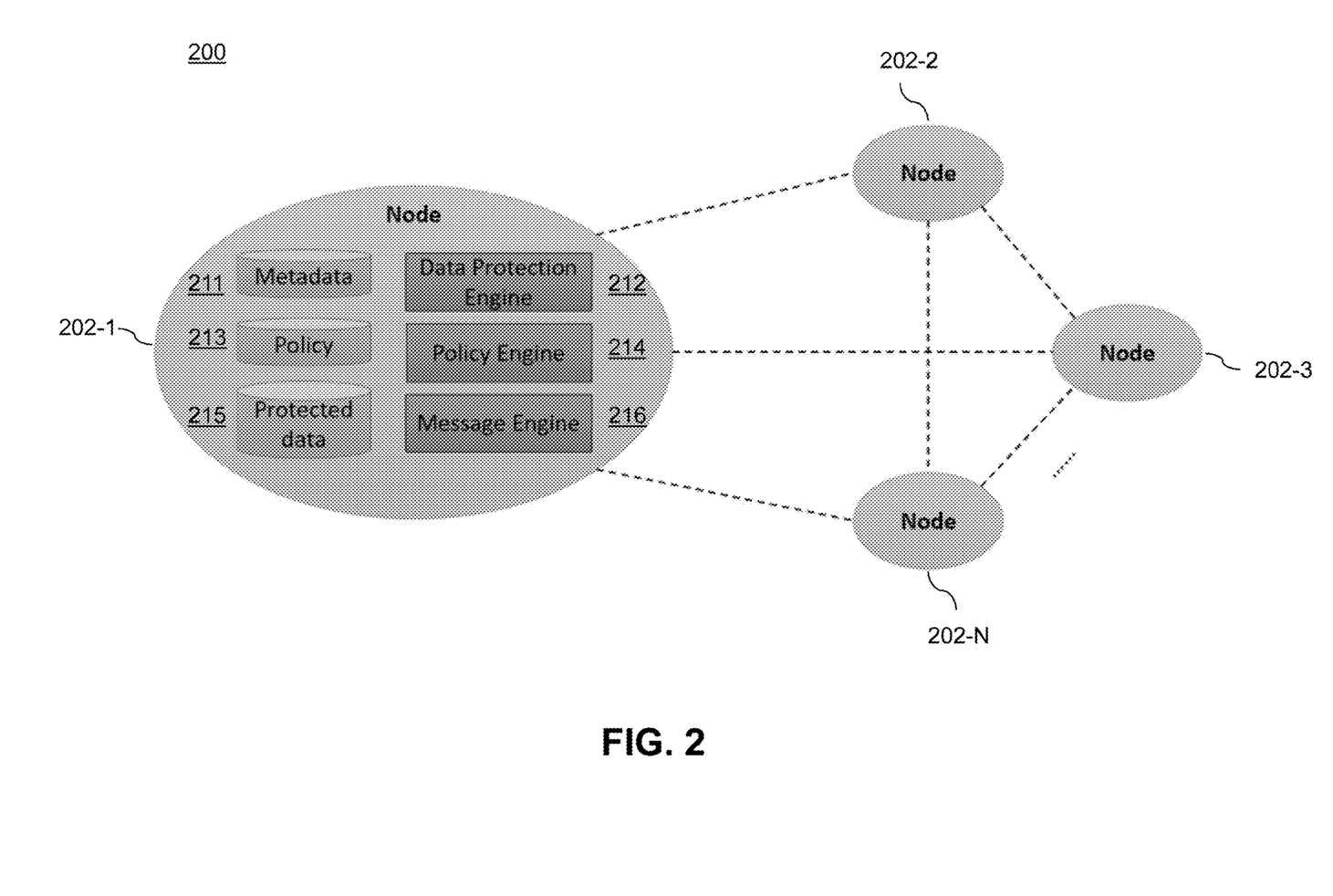
FIG. 2 illustrates a decentralized data protection system using local metadata, according to an illustrative embodiment.

FIG. 2 illustrates a decentralized data protection system 200 using local metadata, according to an illustrative embodiment. The terms "local" or "locally" are used from the perspective of a given node, e.g., when a given node checks local metadata or stores metadata locally, it means that the given node is checking metadata stored in memory/storage resident on the given node or storing metadata in the memory/storage resident on the given node. In this illustrative embodiment, as shown, the system 200 includes a plurality of nodes 202-1, 202-2, 202-3, . . . , 202-N. However, in alternative embodiments, more or less nodes may be part of the decentralized data protection system. In some embodiments, one or more nodes of the plurality of nodes 202-1, 202-2, 202-3, . . . , 202-N are part of each cloud platform in a multi-cloud computing environment. Note that while node 202-1 is enlarged to illustrate a node architecture, each other node in the plurality of nodes 202-2, 202-3, . . . , 202-N is configured with the same or similar architecture depicted for node 202-1. As shown, each node of the plurality of nodes 202-1, 202-2, 202-3, . . . , 202-N includes a metadata store 211, a data protection engine 212, a data protection policy store 213, a data protection policy engine 214, a protected data store 215, and a message engine 216.

The data protection system 200 is fully decentralized, i.e., functions without using any master node. That is, each node is configured to store data and search for data at other nodes. For each node, as shown, three types of data are stored locally: a) the metadata (in store 211) corresponding to the locally protected data; b) the data protection policy (in store 213); and c) the data protected (in store 215) on the node.

The data protection engine 212 is configured to periodically check local metadata in store 211 and communicate with other nodes (202-2, 202-3, . . . , 202-N) to make sure that data stored locally is well protected (e.g., "well protected" refers to a healthy state and no node failure). The data protection policy engine 214 in some embodiments is blockchain-based wherein the engine 214 periodically queries a blockchain (distributed ledger) to obtain the latest data protection policy. In some embodiments, policy publishing techniques described in U.S. patent application identified as U.S. Ser. No. 16/048,785, entitled "Decentralized Policy Publish and Query System for Multi-Cloud Computing Environment," and filed on Jul. 30, 2018, now U.S. Pat. No. 10,824,740, the disclosure of which is incorporated by reference in its entirety herein, are employed. The message engine 216 is configured to handle all the communications among nodes.

Figure 3:
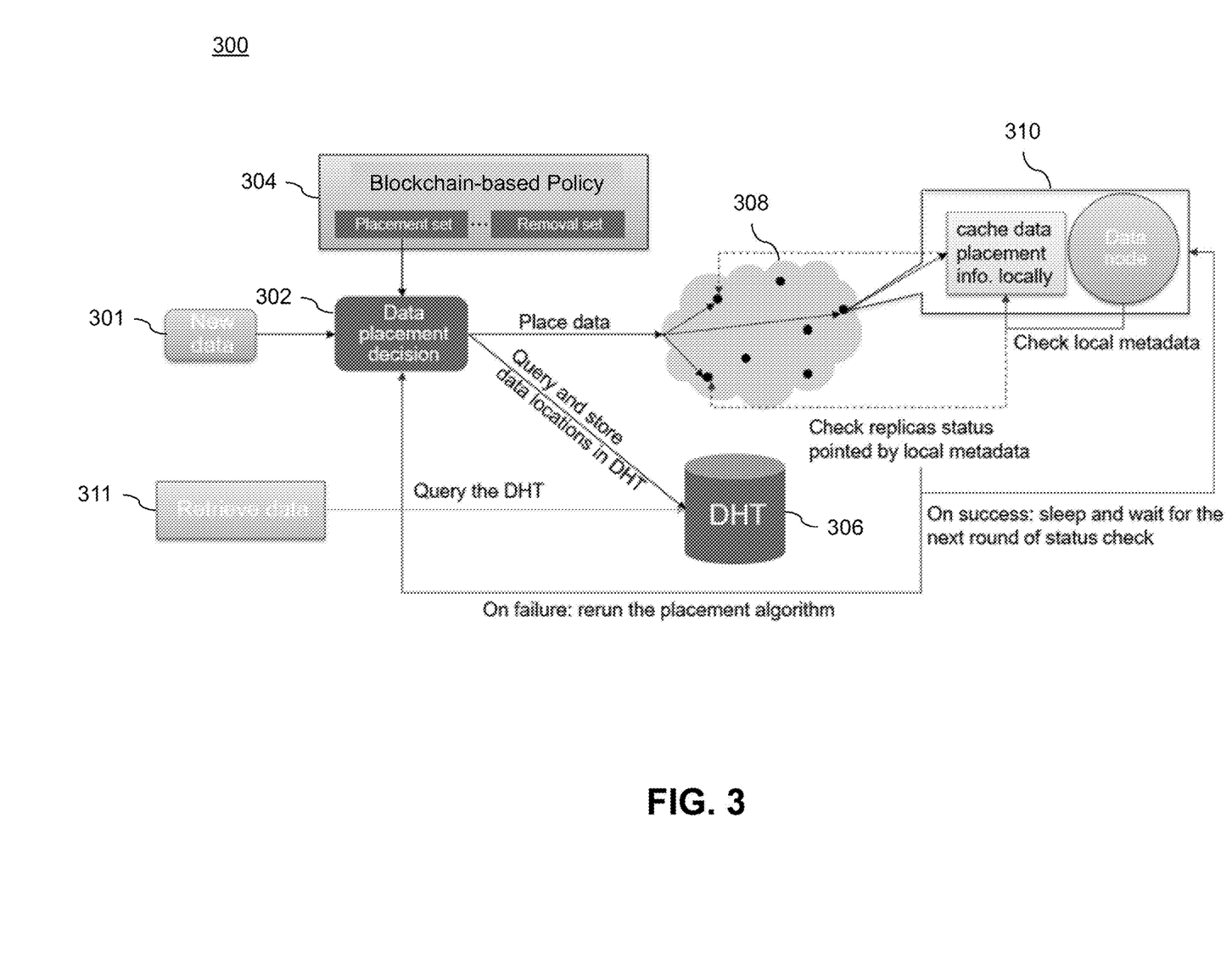
FIG. 3 illustrates a process for storing and retrieving data in a decentralized data protection system using local metadata, according to an illustrative embodiment.

Note that while not expressly shown in FIG. 2, in illustrative embodiments, each of the nodes 202-1, 202-2, 202-3, ..., 202-N contains a DHT, as will be further explained in the context of FIG. 3.

FIG. 3 illustrates a process 300 for storing and retrieving data in a decentralized data protection system using local metadata, according to an illustrative embodiment. For example, in illustrative embodiments, process 300 is implemented in decentralized data protection system 200 in FIG. 2.

For newly arrived data 301 to be protected by decentralized data protection system 200, the process 300 enables the node receiving the data (one of 202-1, 202-2, 202-3, ..., 202-N) to make a data placement decision 302. It is to be appreciated that because system 200 is a fully decentralized system, there is no need for a dedicated central system node for receiving data. Thus, a receiving node can be any one of the nodes 202-1, 202-2, 202-3, ..., 202-N. While nodes 202-1, 202-2, 202-3, ..., 202-N may all be nodes associated with one or more cloud platforms, one or more of nodes 202-1, 202-2, 202-3, ..., 202-N can be blockchain nodes as well, including nodes that actually store the distributed ledger as well as nodes that are client nodes that access a node that actually stores the distributed ledger. Thus, in addition to the components and functions described above in a given node of FIG. 2 (202-1, 202-2, 202-3, ..., 202-N), each node in the system is configured to perform the data placement decision 302 function. Likewise, as will be explained below, in illustrative embodiments, each node is configured with a DHT 306. In illustrative embodiments, DHT functionality in the nodes is implemented with IPFS, as explained above.

The decision 302 is made by the receiving node first checking data protection policy 304 (via policy engine 214), and then querying the DHT 306 to find the nodes in the system to place the data, i.e., nodes in multi-cloud computing environment 308 represented by block dots.

Secondly, the process 300 enables placement of the data on the found nodes and creation of corresponding metadata on those nodes. For example, as represented by node 310, the data placement information is stored in the local metadata on node 310.

Every node periodically checks the local metadata to make sure that the data protected on the nodes are in a healthy state. If there is any problem detected (e.g., one or more other nodes do not respond correctly due to node failure), the node reruns the data protection algorithm, starting from finding the nodes to placing the data. On success, the node sleeps and waits for the next status check round.

To retrieve the data 311, a user of the system 200 first queries DHT 306 to find a set of nodes storing the data. After connection with one node is established, the user queries the local metadata to find all the nodes actually protecting the data (i.e., each node storing a replica or copy of the data).

It is to be appreciated that a user can query any node 202-1, 202-2, 202-3, ..., 202-N, and each node 202-1, 202-2, 202-3, ..., 202-N has at least a part of the entire DHT stored locally. In one or more illustrative embodiments, a given node that receives a query can query its local part of the DHT and forward the query to the DHTs of other nodes, in a decentralized manner. From the user point of view, in one or more illustrative embodiments, the user only queries the node it connects to, and obtains the response(s) from the same node.

A further detailed explanation of node components of the system 200 in FIG. 2 is given below.

Figure 4:
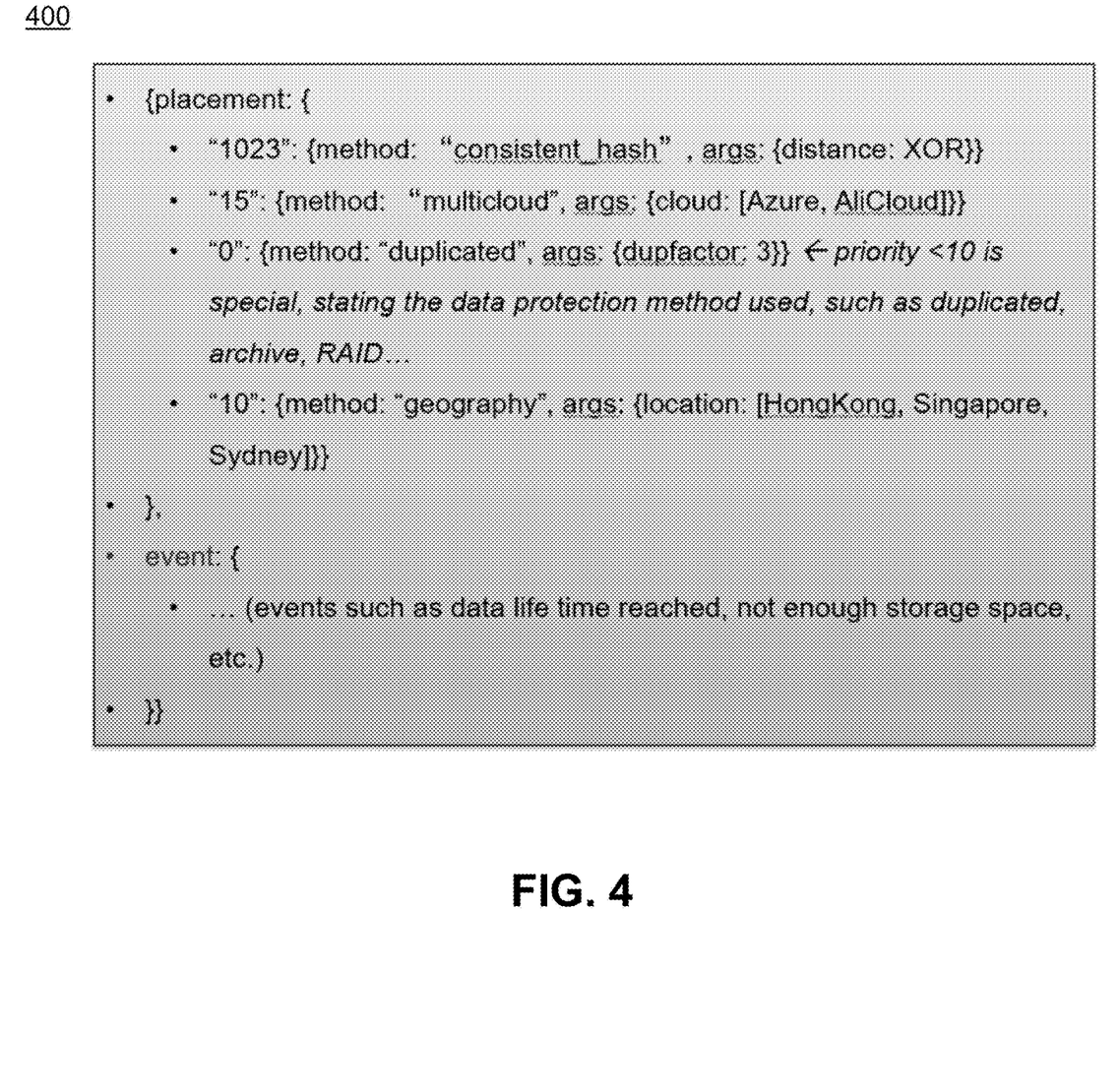
FIG. 4 illustrates a data protection policy associated with a decentralized data protection system using local metadata, according to an illustrative embodiment.

In one or more illustrative embodiments, the policy engine 214 is based on a blockchain. For example, the policy engine 214 constantly queries the blockchain (not expressly shown in FIG. 2) to obtain the latest data protection policy. One example of a policy stored locally is as follows:

- cloud: {
  - block_id: 10,
  - hash: [hash],
  - policy: {e.g., refer to FIG. 4}
- }

The hash digest of the policy and the highest identifier (id) of the block are stored locally so that the message engine 216 can negotiate the policy among nodes, since a simple version number is not sufficient in a decentralized system. Policy negotiation among the nodes is implemented in illustrative embodiments since the system has no centralized server to force all the nodes to have the same view of the current effective policy. As such, without policy negotiation, different nodes would work under different versions of the policy, especially when a new policy is only recently published via the blockchain (and perhaps not all nodes have obtained the new policy). Thus, when two nodes communicate with each other, they first make sure that they are working under the same (latest) policy. In one or more illustrative embodiments of policy negotiation, the nodes first exchange the policy version {block_id: 10, hash: [hash],} (see below in the context of FIG. 5), making sure that they are using the same policy. A node using an out-of-date policy (e.g., indicated by a lower block_id number) should update its policy (obtain the latest one from the blockchain), while a node using the latest policy (among the communicating nodes) should reject requests from other nodes with out-of-date policies.

One example data protection policy 400 is shown in FIG. 4. In the figure, the number (e.g., 1023, 15, 0, 10, etc.) is the priority of the placement method (further described below). Further, in the figure, "duplicated" refers to a method wherein the data is protected by creating a number of replicas (defined by the "dupfactor," in this example 3, meaning that the system maintains three copies of a given data set). "Multicloud" refers to a placement method wherein the data is placed on clouds defined by "args" (e.g., in this example, on an Azure cloud and an AliCloud). "Geography" refers to a placement method wherein the data is also placed based on the physical locations defined by the "args" (e.g., in this example, Hong Kong, Singapore and Sydney). The placement method "consistent_hash" chooses the nodes based on the consistent hash method, using the distance method defined by the "args" (Exclusive OR (XOR) distance in this example).

In illustrative embodiments, priority defines how the system finds nodes. Once the system determines the dupfactor from the policy, the system then starts from the policy with the smallest non-zero priority value (i.e., highest priority). For example, as illustrated in the policy 400 of FIG. 4, the system first finds nodes in Hong Kong, Singapore and Sydney. At this stage, the found nodes could be provided by Azure, AliCloud and AWS. Then, based on the rule with priority 15, only the nodes provided by Azure and AliCloud will be kept.

Policy 400 illustrates that complex data protection methods (such as data archiving) and complex data placement methods (such as consistent hash) are supported by the decentralized data protection system 200. Another example of a hash-based method for placing data that can be employed or otherwise adapted for use is the CRUSH algorithm by S. A. Weil et al. which provides a scalable pseudorandom data distribution function designed for distributed object-based storage systems that efficiently maps data objects to storage devices without relying on a central directory. However, a consistent hash-based method that can be used for the data placement method can be solely based on the hash distance between the data and the node.

In an illustrative embodiment, a procedure of data protection engine 212 is as follows:

For each data D (e.g., object, item, set, etc.) protected locally:
  Check local metadata:
    If D has been recently checked (based on the last checked time stored in the metadata);
      Skip;
  Check whether or not the applicable data protection policy has been changed:
    If yes, rerun the initial data protection procedure (described below);
  Check the data protection status of D based on the metadata (by communicating with other nodes also protecting D):
    If a failure occurs, rerun the initial data protection procedure
  If no failures;
    update the last checked time in the metadata.

Figure 5:
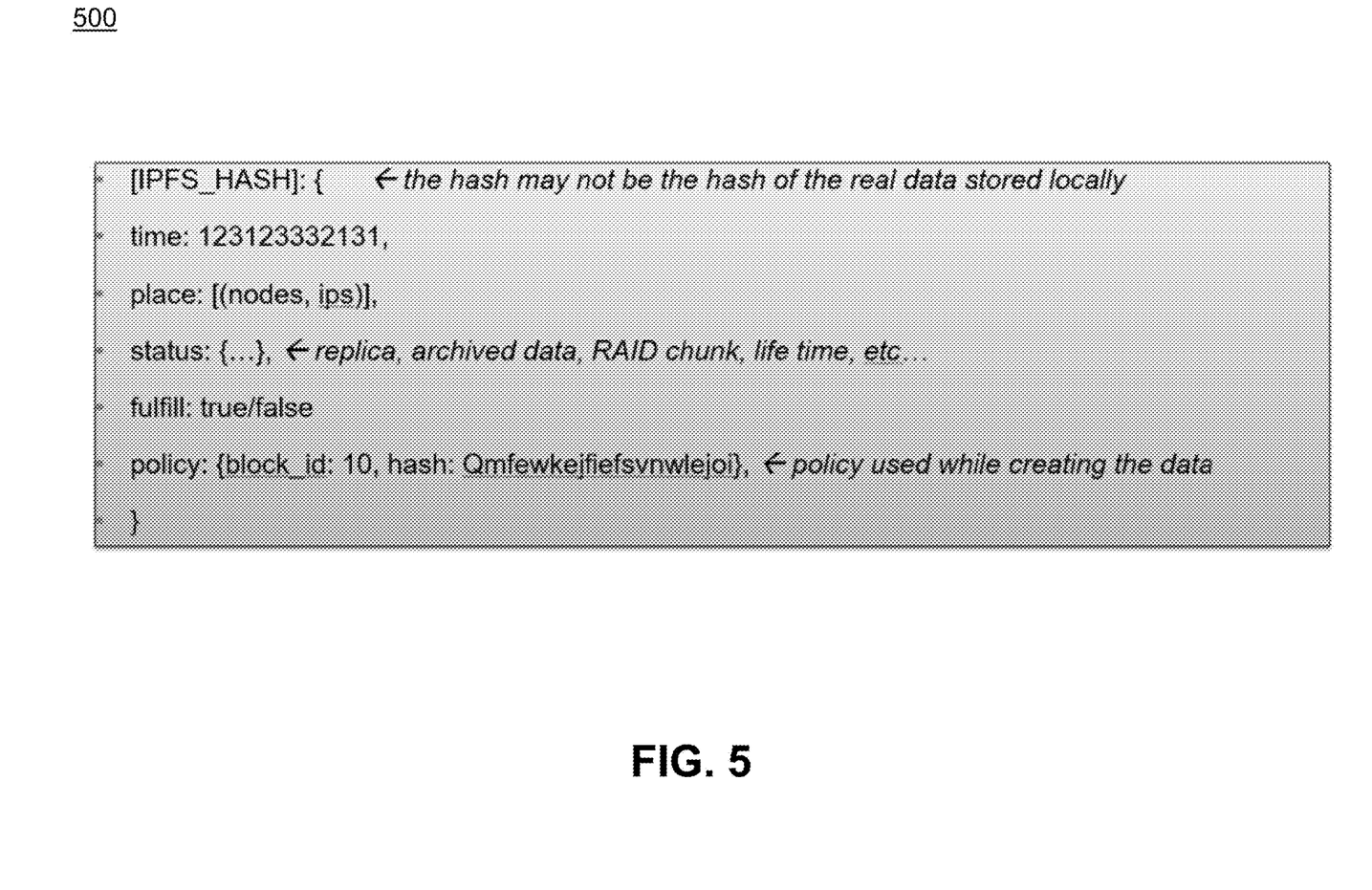
FIG. 5 illustrates metadata associated with a decentralized data protection system using local metadata, according to an illustrative embodiment.

An example 500 of the locally-stored metadata is illustrated in FIG. 5.

The data protection engine 212 has many advantages, e.g.:

(i) There is no need to migrate data every time new nodes join the system. The metadata stores the data placement information so that the protected data can be found even if consistent hash-based placement rules are violated (due to the addition of new nodes).

(ii) The system does not need to query the DHT every time to find the nodes storing the data, and then check whether the data replicas are in a healthy state. The node only needs to communicate directly with the nodes storing the replicas, reducing the communication among nodes significantly.

(iii) The local metadata can also store additional data status information, such as whether the local data is an erasure code-based (example of forward error correction) chunk or archived data, so that advanced data protection features can be integrated in a straightforward manner into such a decentralized data protection system.

Note that the flag "fulfill" in the local metadata in FIG. 5 indicates whether or not the node finding process is successful. For example, in the FIG. 4 example, recall that three replicas are required. If only two nodes are found to place the replicas, the flag fulfill is set to false. The system periodically reruns the node finding and replica placement processes until the flag is set to true.

Figure 6:
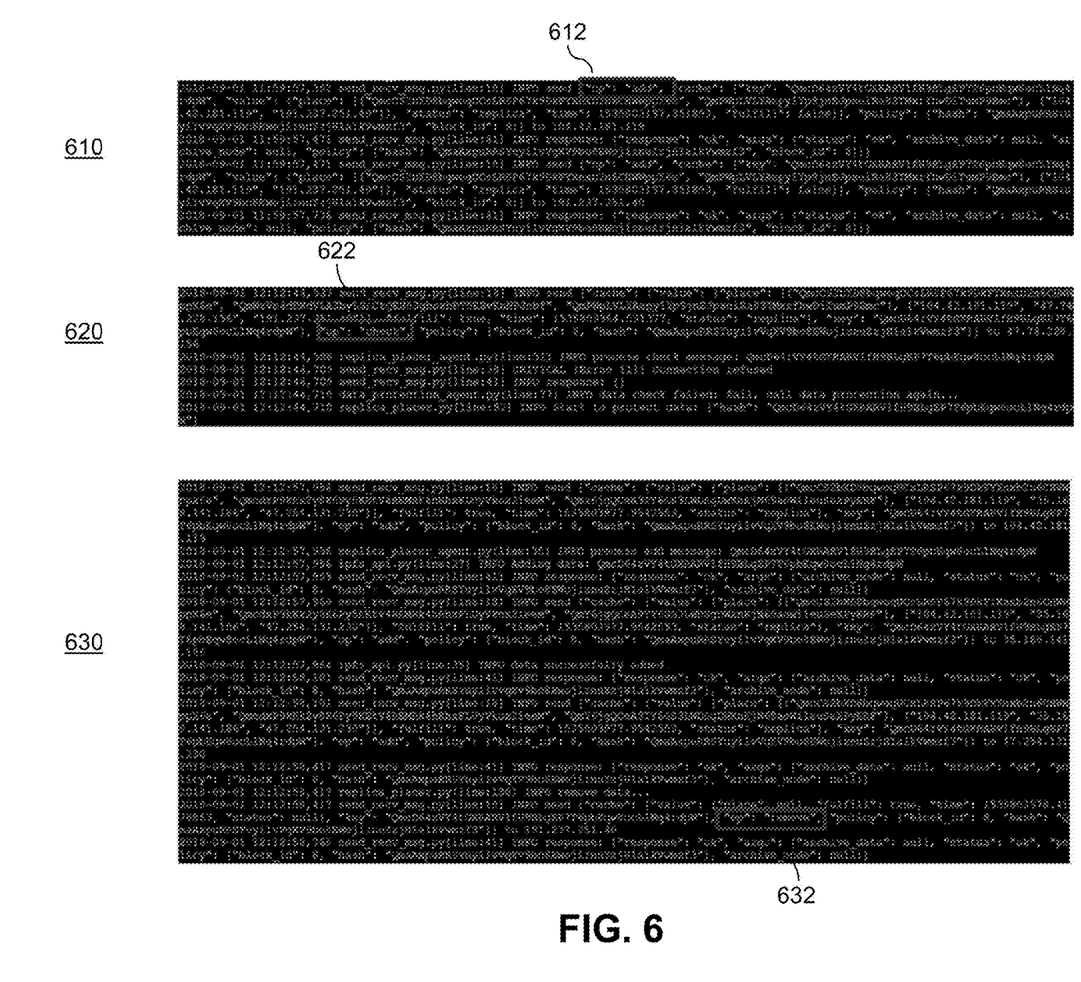
FIG. 6 illustrates messages exchanged by nodes in a decentralized data protection system using local metadata, according to an illustrative embodiment.

In accordance with one or more illustrative embodiments, message engine 216 is configured to perform the following procedure:

For any incoming message, first negotiate the data protection policy:
  If match, proceed;
  If local policy is out-of-date, call update policy procedure;
  If local policy is newer, reply 'policy mismatch' and do nothing;
Process the message:
  Add operation, e.g., see message 610 with add operation 612 in FIG. 6;
  Remove operation, e.g., see message 630 with remove operation 632 in FIG. 6;
  Check operation, e.g., see message 620 with check operation 622 in FIG. 6;
  Archive, RAID chunk, etc.
The message contains the metadata and operation code:
  {cache: {metal is illustrated in FIG. 5};
  op: add/remove/check/ . . . ;
  }

In one or more illustrative embodiments, JavaScript Object Notation (JSON) is used. In such cases, the order of entries in the message does not necessarily matter. Also note that alternative implementations of FIG. 5 are contemplated.

In one illustrative embodiment, a data protection procedure is as follows:

For data to be protected:
  Find applicable data protection policy:
    Duplicate, archive, RAID . . . ;
  Find nodes based on the policy:
    First find nodes with properties specified by the user, e.g., locations such as Hong Kong, Singapore, Sydney, and cloud providers such as Azure and AliCloud;
    Then order the nodes based on the consistent hash;
  Protect the data based on the policy and nodes found:
    Create the chunks required by the policy;
    Place the chunks on the nodes found;
    Create local metadata on the given nodes.

Note that when the method "duplicated" is used, chunks refer to replicas.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with decentralized data protection using local metadata functionality will now be described in greater detail with reference to FIGS. 7 and 8. Although described in the context of system 200, these platforms may also be used to implement at least portions of other information processing systems in other embodiments.

Figure 7:
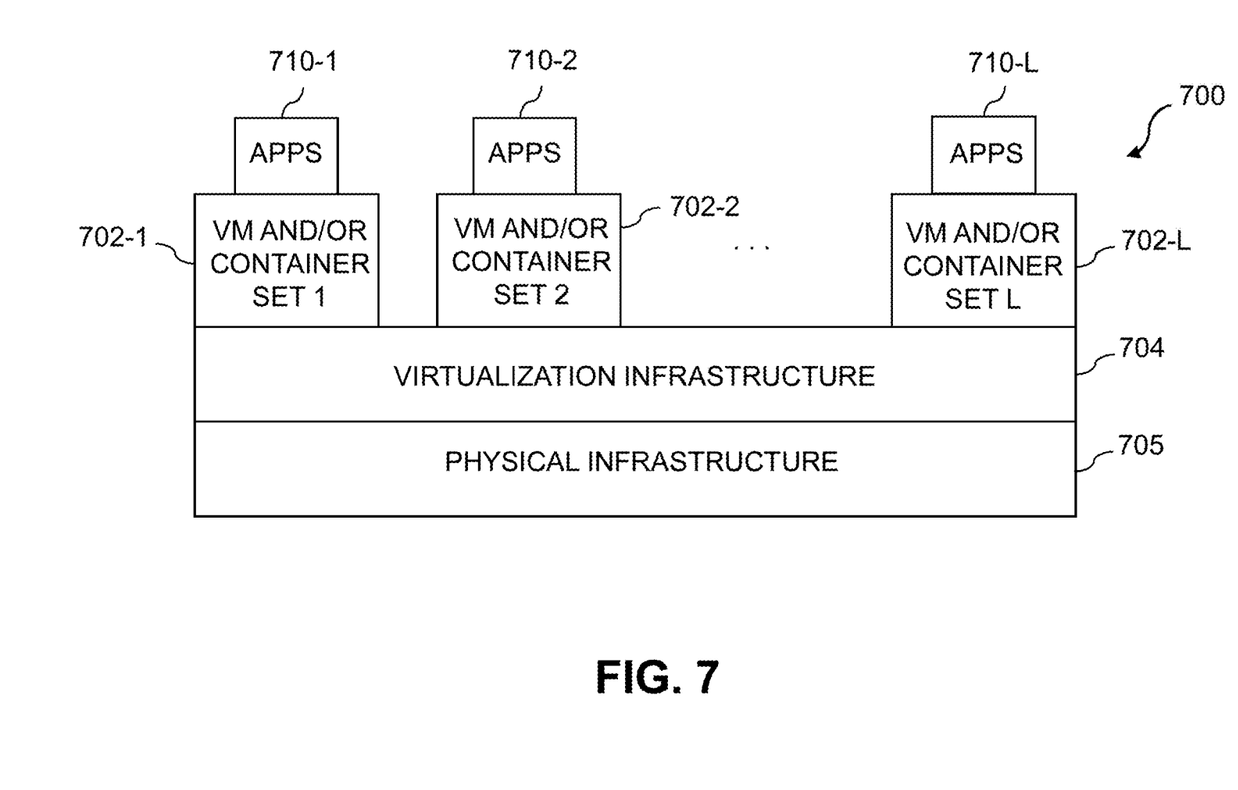
FIGS. 7 and 8 illustrate examples of processing platforms that may be utilized to implement at least a portion of a decentralized data protection system using local metadata, according to illustrative embodiments.
Figure 8:
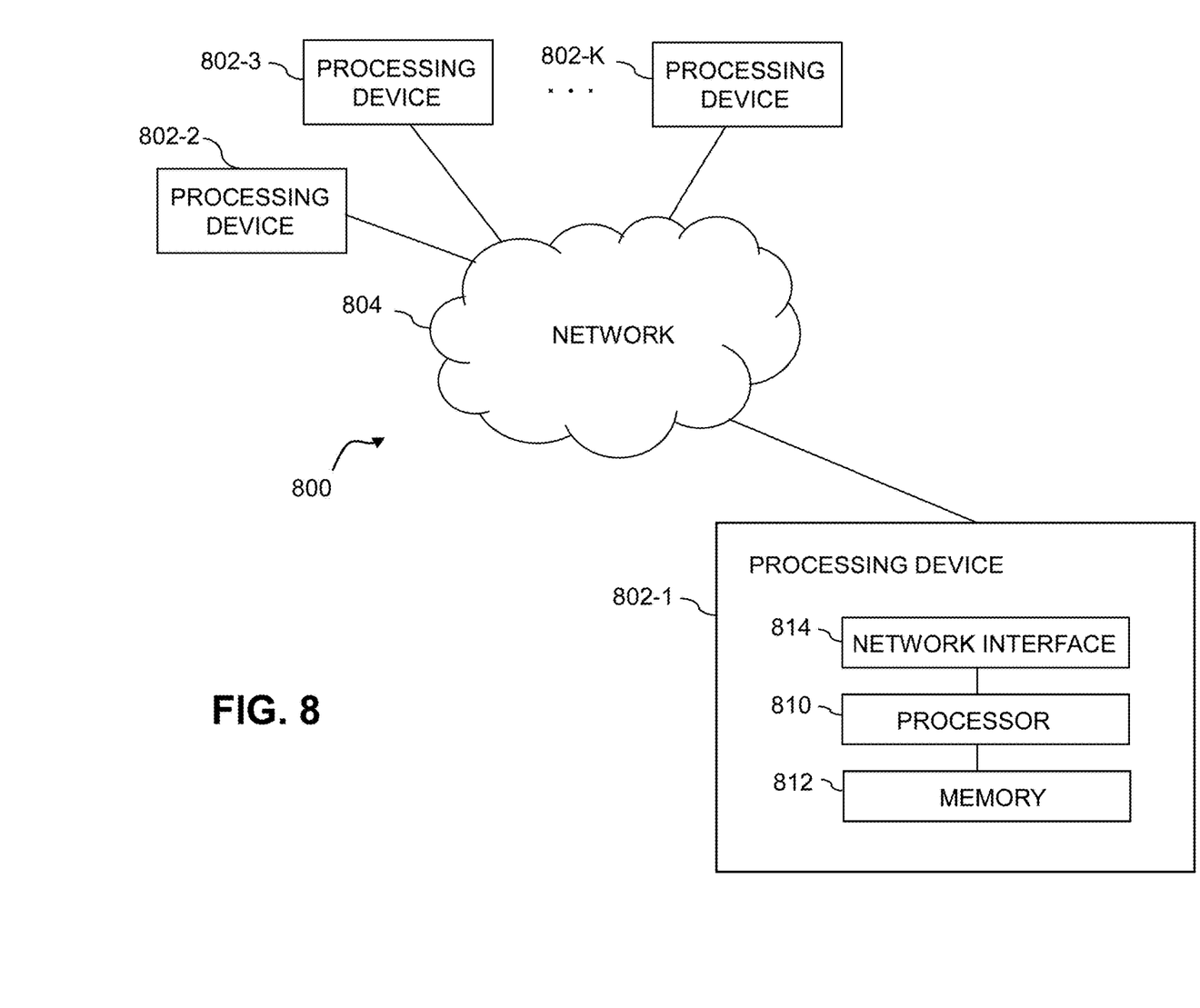

FIG. 7 shows an example processing platform comprising cloud infrastructure 700. The cloud infrastructure 700 comprises a combination of physical and virtual processing resources that may be utilized to implement at least a portion of system 200. The cloud infrastructure 700 comprises multiple virtual machines (VMs) and/or container sets 702-

1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide local metadata storage functionality of the type described above for one or more processes running on a given one of the VMs. For example, each of the VMs can implement local metadata storage functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide decentralized data protection of the type described above for one or more processes running on different ones of the containers. For example, a container host device supporting multiple containers of one or more container sets can implement one or more instances of decentralized data protection logic for use in implementing the functionalities described herein.

As is apparent from the above, one or more of the processing modules or other components of system 200 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 200 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 10 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the decentralized data protection using local metadata functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, decentralized data protection processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   in a decentralized system of nodes configured to provide data protection functionality, wherein at least a subset of the nodes store and share data using content-addresses managed via a distributed hash table in each of the subset of nodes;
   locally storing in a given one of the subset of nodes: a data protection policy to be implemented by the given node; data protected on the given node; and metadata comprising information indicating placement of a given data set on one or more other ones of the subset of nodes;
   the given one of the subset of nodes accessing the locally stored metadata to manage protection of the given data set on the one or more other ones of the subset of nodes;
   the given one of the subset of nodes obtaining an up-to-date version of the data protection policy from a distributed ledger;
   the given one of the subset of nodes, upon communication with another node, negotiating the up-to-date version of the data protection policy to ensure both nodes are implementing the same data protection policy; and
   responsive to the other node of the subset of nodes having an out-of-date policy version of the data protection policy, rejecting the other node.

2. The method of claim 1, further comprising updating the locally stored metadata to reflect the up-to-date version of the data protection policy that the given one of the subset of nodes is currently applying for the given data set.

3. The method of claim 1, further comprising the given one of the subset of nodes executing a data placement process upon initial receipt of the given data set, wherein the data placement process determines placement of the given data set on the one or more other ones of the subset of nodes in accordance with the data protection policy.

4. The method of claim 1, further comprising the given one of the subset of nodes receiving a query to access the given data set on one or more nodes on which the given data set is placed.

5. The method of claim 4, further comprising the given one of the subset of nodes accessing the locally stored metadata to determine on which nodes the given data set is placed.

6. The method of claim 5, further comprising the given one of the subset of nodes communicating with the nodes on which the given data set is placed.

7. The method of claim 1, wherein the data protection policy comprises one or more data storage methods.

8. The method of claim 7, wherein the one or more data storage methods comprise one of a duplication function, an archive function, and a RAID function.

9. The method of claim 7, wherein the data protection policy comprises one or more data placement methods.

10. The method of claim 9, wherein the one or more data placement methods comprise a consistent hash-based method.

11. The method of claim 9, wherein the one or more data placement methods comprise one or more of a geographic property and a cloud provider property.

12. The method of claim 1, further comprising the given one of the subset of nodes re-executing a data placement process upon checking that a failure occurred with respect to at least one of the nodes upon which the given data set is placed; wherein the re-executed data placement process determines placement of the given data set on the one or more other ones of the subset of nodes in accordance with the data protection policy.

13. An article of manufacture comprising a non-transitory processor-readable storage medium having stored therein program code of one or more software programs, wherein the program code when executed by at least one processing device of a given node causes the given node to perform steps of:
   in a decentralized system of nodes, including the given node, configured to provide data, protection functionality, wherein at least a subset of the nodes store and share data using content-addresses managed via a distributed hash table in each of the subset of nodes;
   locally storing at the given node: a data protection policy to be implemented by the given node; data protected on the given node; and metadata comprising information indicating placement of a given data set on one or more other ones of the subset of nodes;
   accessing at the given node the locally stored metadata to manage protection of the given data set on the one or more other ones of the subset of nodes;
   the given one of the subset of nodes obtaining an up-to-date version of the data protection policy from a distributed ledger;
   the given one of the subset of nodes, upon communication with another node, negotiating the up-to-date version of the data protection policy to ensure both nodes are implementing the same data protection policy; and
   responsive to the other node of the subset of nodes having an out-of-date policy version of the data protection policy, rejecting the other node.

14. The article of claim 13, further comprising the given node executing a data placement process upon initial receipt of the given data set, wherein the data placement process determines placement of the given data set on the one or more other ones of the subset of nodes in accordance with the data protection policy.

15. The article of claim 13, wherein the given node further performs the step of re-executing a data placement process upon checking that a failure occurred with respect to at least one of the nodes upon which the given data set is placed; wherein the re-executed data placement process determines placement of the given data set on the one or more other ones of the subset of nodes in accordance with the data protection policy.

16. An apparatus comprising at least one processing device, wherein the at least one processing device comprises a processor coupled to a memory to form a given node configured to:
   in a decentralized system of nodes, including the given node, configured to provide data protection functionality, wherein at least a subset of the nodes store and share data using content-addresses managed via a distributed hash table in each of the subset of nodes;

locally store at the given node: a data protection policy to be implemented by the given node; data protected on the given node; and metadata comprising information indicating placement of a given data set on one or more other ones of the subset of nodes;

access at the given node the locally stored metadata to manage protection of the given data set on the one or more other ones of the subset of nodes;

the given one of the subset of nodes obtaining an up-to-date version of the data protection policy from a distributed ledger;

the given one of the subset of nodes, upon communication with another node, negotiating the up-to-date version of the data protection policy to ensure both nodes are implementing the same data protection policy; and responsive to the other node of the subset of nodes having an out-of-date policy version of the data protection policy, reject the other node.

17. The apparatus of claim 16, wherein the given node is further configured to execute a data placement process upon initial receipt of the given data set, wherein the data placement process determines placement of the given data set on the one or more other ones of the subset of nodes in accordance with the data protection policy.

18. The apparatus of claim 16, wherein the given node is further configured to update the locally stored metadata to reflect the up-to-date version of the data protection policy that the given node is currently applying for the given data set.

19. The apparatus of claim 16, wherein the given node is further configured to receive a query to access the given data set on one or more nodes on which the given data set is placed.

20. The apparatus of claim 16, wherein the given node is further configured to re-execute a data placement process upon checking that a failure occurred with respect to at least one of the nodes upon which the given data set is placed; wherein the re-executed data placement process determines placement of the given data set on the one or more other ones of the subset of nodes in accordance with the data protection policy.

* * * * *